United States Patent [19]
Sugaya

[11] Patent Number: 5,726,966
[45] Date of Patent: Mar. 10, 1998

[54] OPTICAL RECORDING MEDIUM REPRODUCING APPARATUS USING EDGE DETECTING TECHNIQUE

[75] Inventor: Takumi Sugaya, Kokubunji, Japan

[73] Assignee: Olympus Optical Co., Ltd., Tokyo, Japan

[21] Appl. No.: 755,977

[22] Filed: Nov. 25, 1996

[30] Foreign Application Priority Data

Nov. 28, 1995 [JP] Japan .................. 7-308870

[51] Int. Cl.$^6$ .................................................. G11B 7/00
[52] U.S. Cl. .................................. 369/124; 369/59
[58] Field of Search .................... 369/124, 59, 116, 369/60, 15, 32; 235/454

[56] References Cited

U.S. PATENT DOCUMENTS

| | | | |
|---|---|---|---|
| 4,652,730 | 3/1987 | Marshall | 369/47 |
| 4,989,196 | 1/1991 | Ishikawa et al. | 369/59 |
| 5,315,569 | 5/1994 | Saito et al. | 369/47 |
| 5,418,770 | 5/1995 | Ide et al. | 369/116 |
| 5,420,849 | 5/1995 | Matsueda | 369/124 |

*Primary Examiner*—Tan Dinh
*Attorney, Agent, or Firm*—Frishauf, Holtz, Goodman, Langer & Chick, P.C.

[57] ABSTRACT

A demodulation device for use with an optical recording medium comprises an edge detector for detecting edges of a binary signal corresponding to marks written onto the optical recording medium as information, an edge interval measuring circuit for measuring a value for the interval between two successive edges detected by the edge detector, a storage device for storing a table that relates thresholds representing upper and lower limits on at least one of a length of the mark and an interval between the marks to demodulated bit strings, and a data converter for comparing an edge interval value obtained by the edge interval measuring circuit with the thresholds representing upper and lower limits to thereby determine one of corresponding a length of the mark and an interval between marks and obtain a demodulated bit string corresponding to the edge interval value measured from the table.

10 Claims, 19 Drawing Sheets

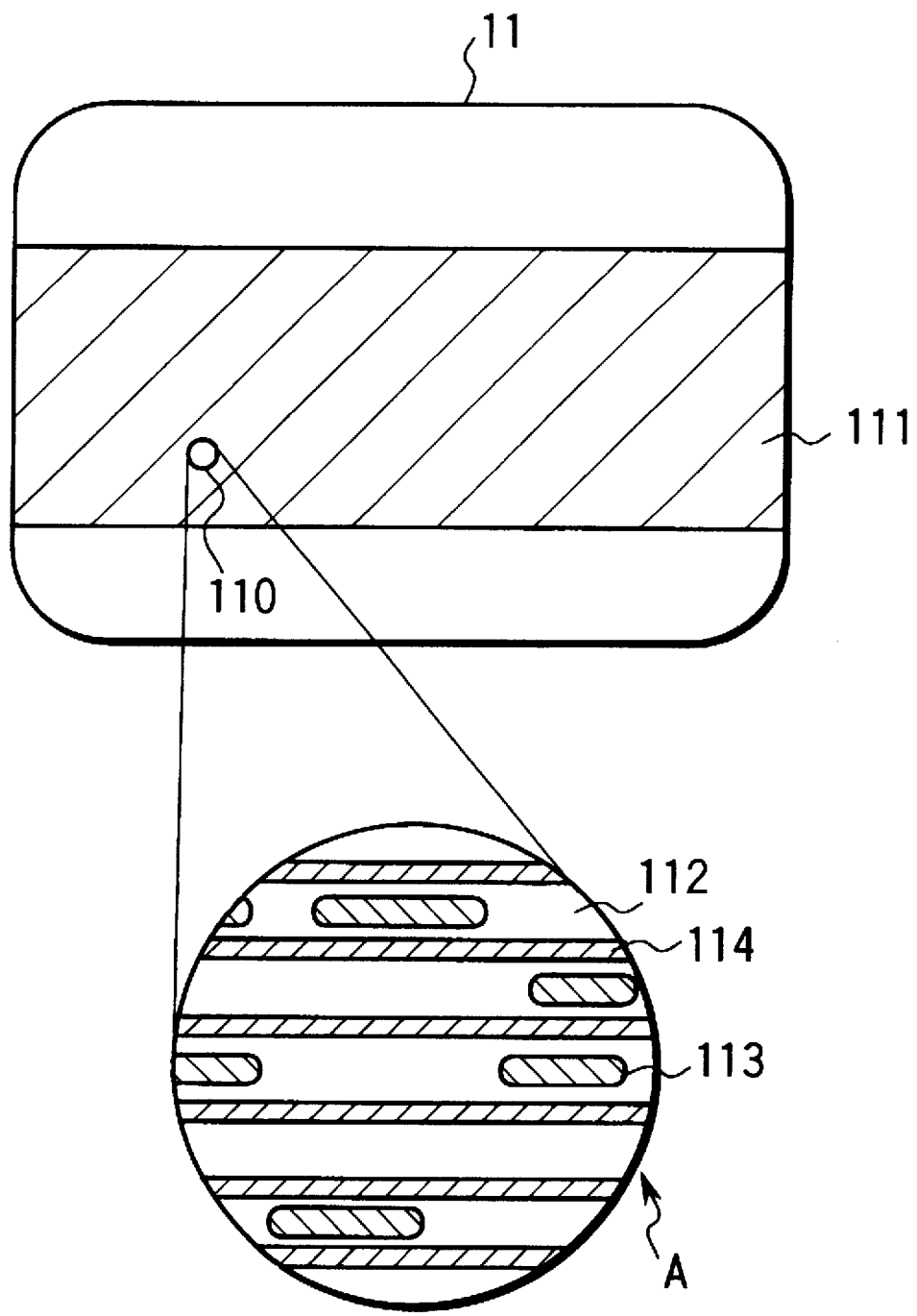
F I G. 1

FIG. 3

| LI | SY | A0 | A1 | A2 | A3 | A4 | A5 | A6 | A7 | A8 | A9 | A10 | A11 | SY |
|---|---|---|---|---|---|---|---|---|---|---|---|---|---|---|
|  |  | B0 | B1 | B2 | B3 | B4 | B5 | B6 | B7 | B8 | B9 | B10 | B11 | SY |
|  |  | C0 | C1 | C2 | C3 | C4 | C5 | C6 | C7 | C8 | C9 | C10 | C11 | SY |
|  |  | D0 | D1 | D2 | D3 | D4 | D5 | D6 | D7 | D8 | D9 | D10 | D11 | SY |
|  |  | E0 | E1 | E2 | E3 | E4 | E5 | E6 | E7 | E8 | E9 | E10 | E11 | SY |
|  |  | F0 | F1 | F2 | F3 | F4 | F5 | F6 | F7 | F8 | F9 | F10 | F11 | SY |
|  |  | G0 | G1 | G2 | G3 | G4 | G5 | G6 | G7 | G8 | G9 | G10 | G11 | SY |
|  |  | H0 | H1 | H2 | H3 | H4 | H5 | H6 | H7 | H8 | H9 | H10 | H11 | SY |
|  |  |  |  |  |  |  |  |  |  |  |  |  |  | LI |

☐ NORMAL DATA  ▨ ERROR CORRECTING CODE  LI···LEADIN  SY···SYNC

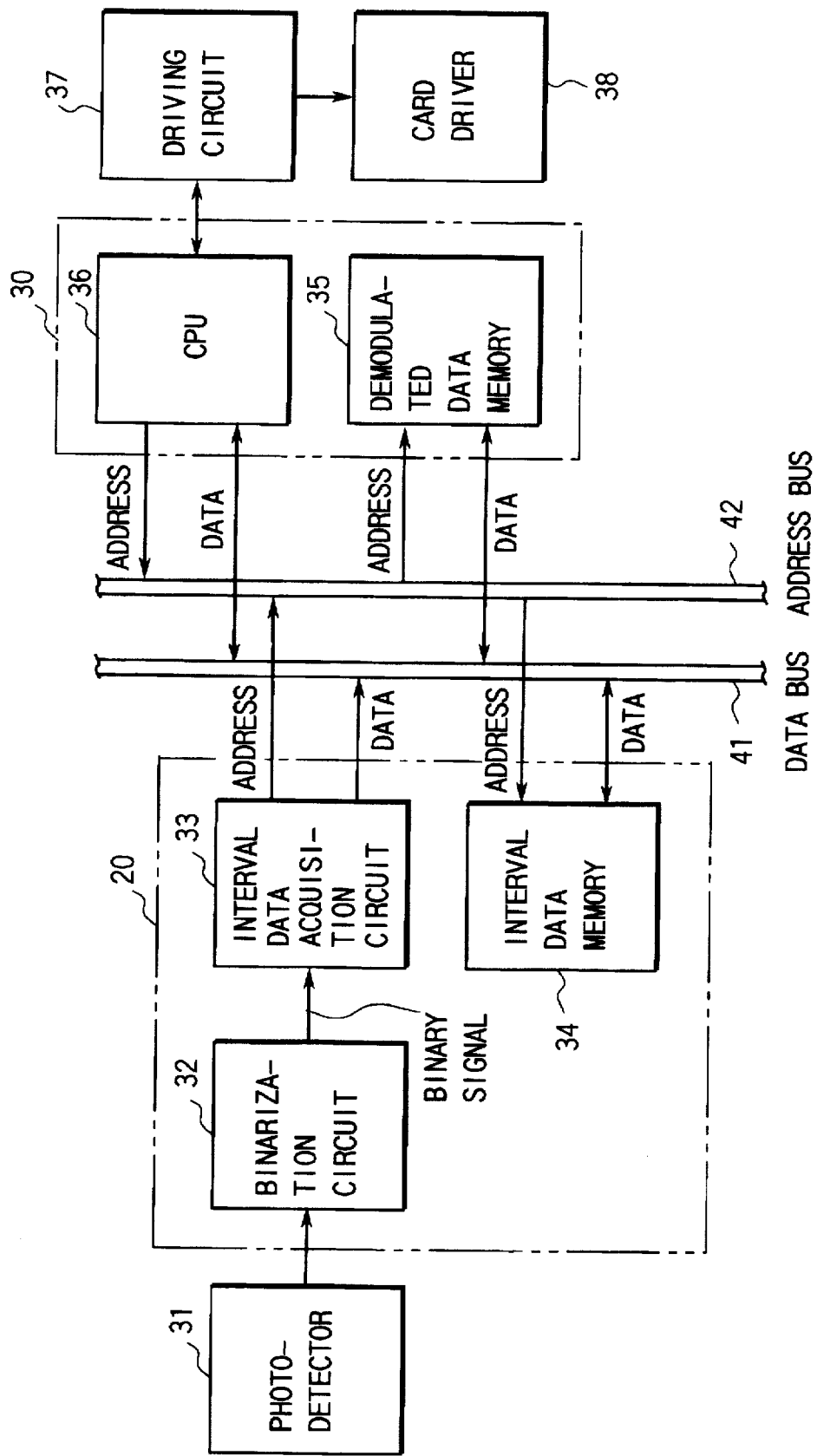
F I G. 4

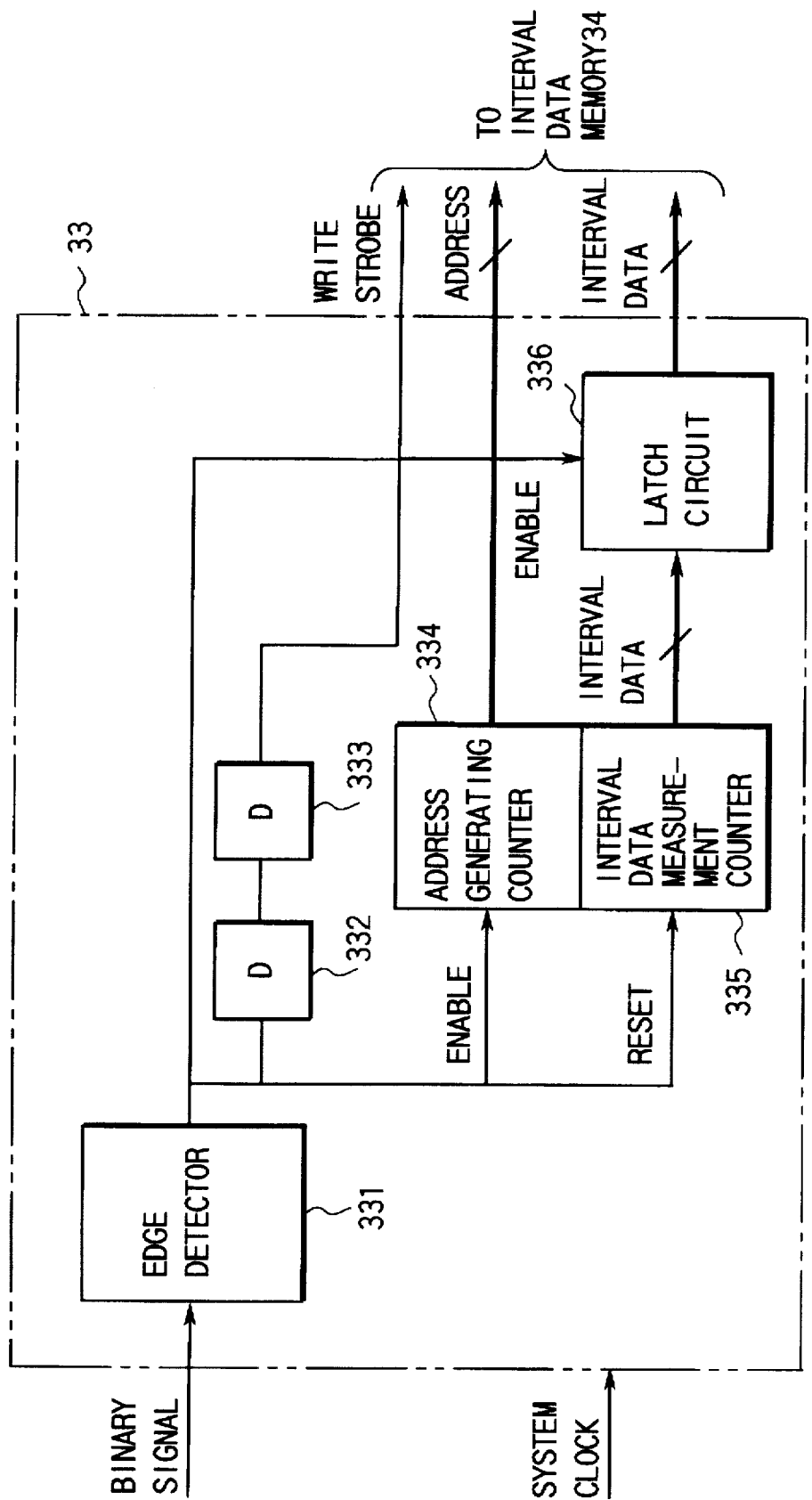
F I G. 5

| MARK LENGTH | NUMERICAL RANGE | DEMODULATED DATA |
|---|---|---|
| 1T | 20~59 | 1 |
| 2T | 60~99 | 01 |
| 3T | 100~139 | 001 |
| 4T | 140~179 | 0001 |

F I G. 7

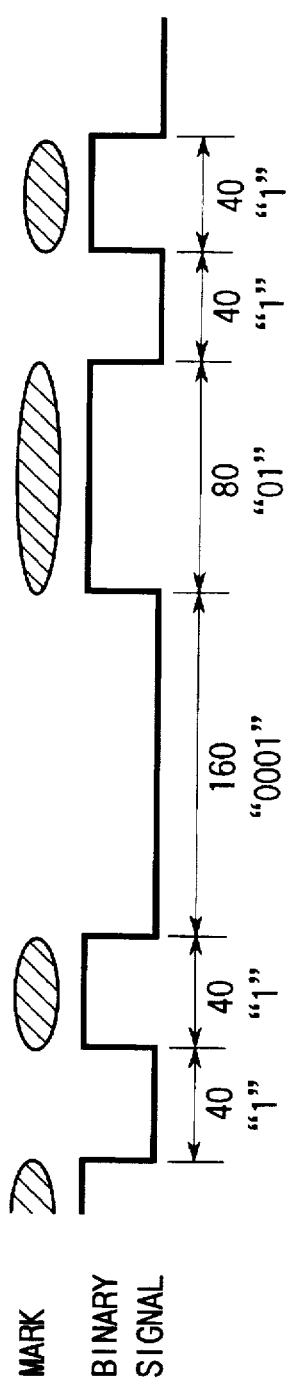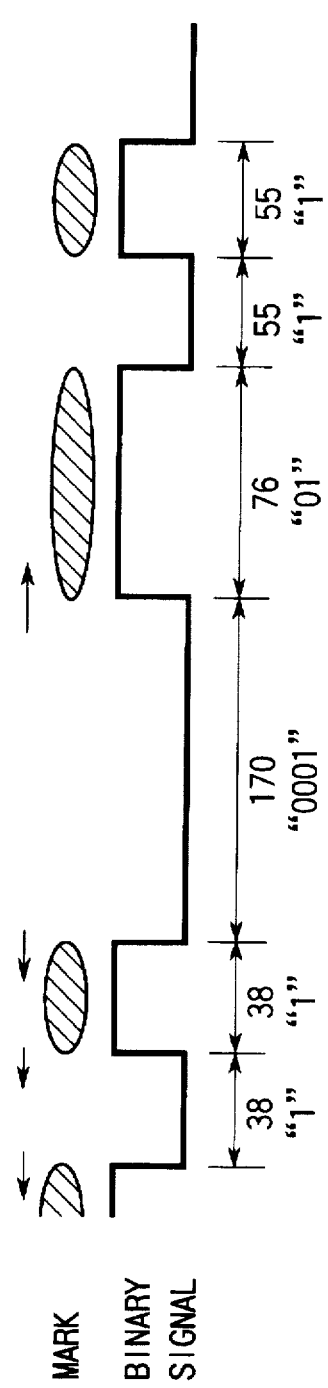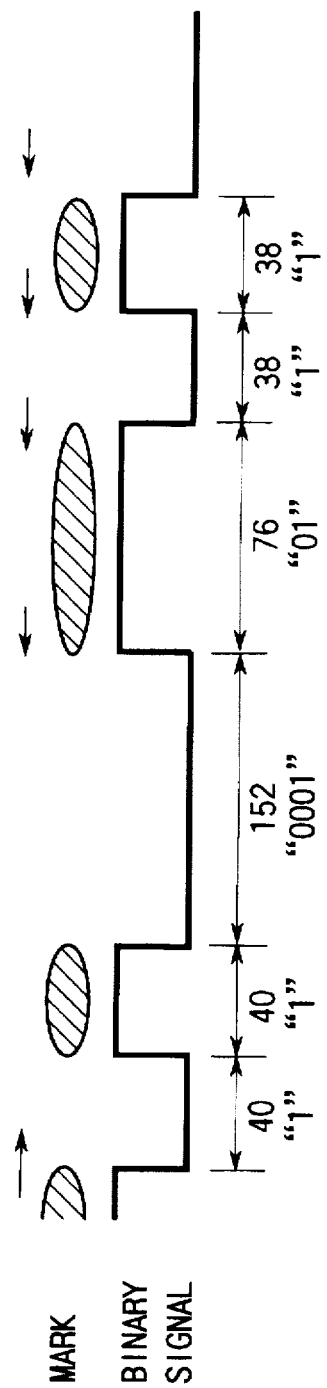

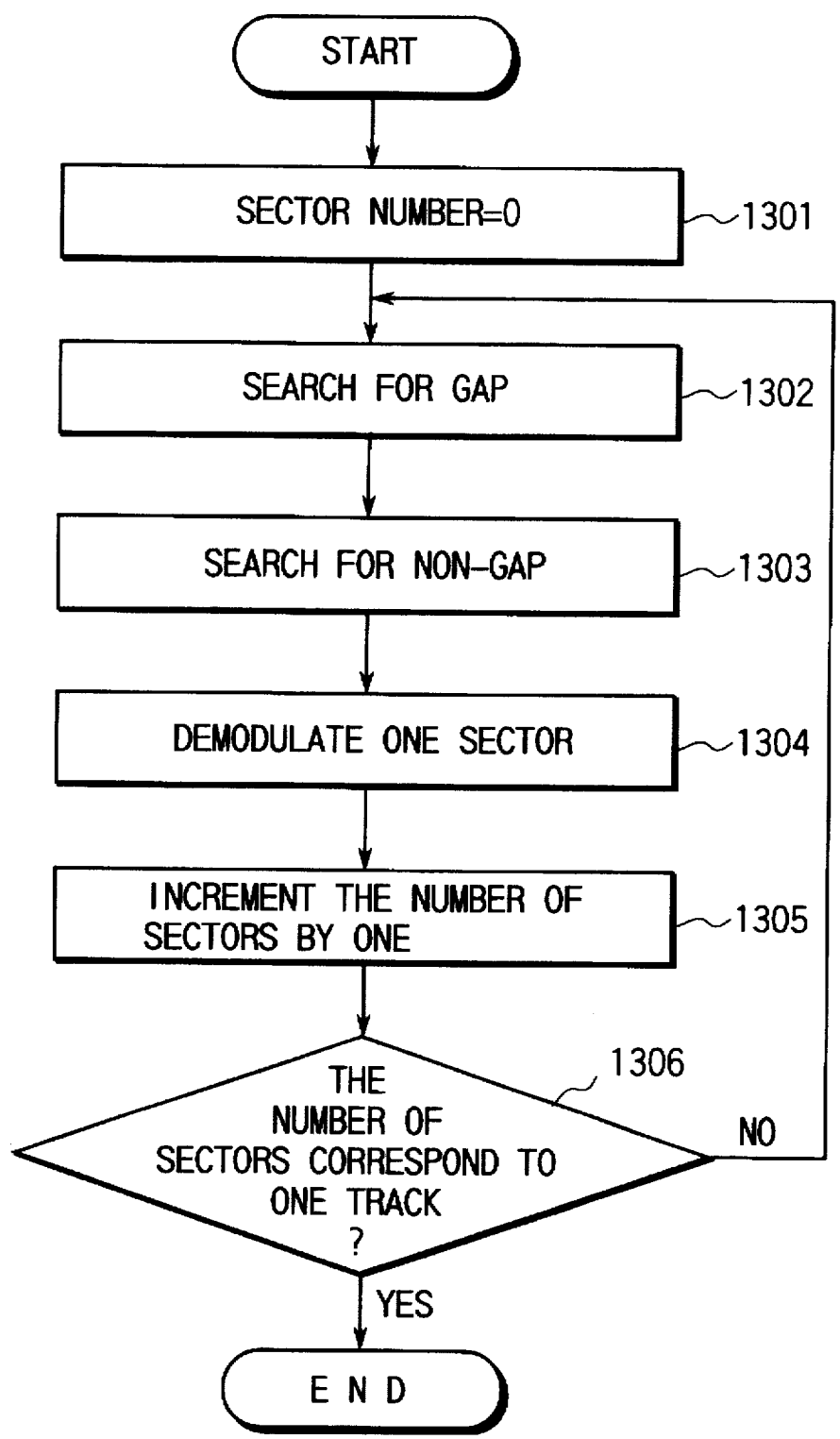
F I G. 1 3

|    | A0 | A1 | A2 | A3 | A4 | A5 | A6 | A7 | A8 | A9 | A10 | A11 | SY |
|----|----|----|----|----|----|----|----|----|----|----|-----|-----|----|
|    | B0 | B1 | B2 | B3 | B4 | B5 | B6 | B7 | B8 | B9 | B10 | B11 | SY |
|    | C0 | C1 | C2 | C3 | C4 | C5 | C6 | C7 | C8 | C9 | C10 | C11 | SY |
|    | D0 | D1 | D2 | D3 | D4 | D5 | D6 | D7 | D8 | D9 | D10 | D11 | SY |
|    | E0 | E1 | E2 | E3 | E4 | E5 | E6 | E7 | E8 | E9 | E10 | E11 | SY |
|    | F0 | F1 | F2 | F3 | F4 | F5 | F6 | F7 | F8 | F9 | F10 | F11 | SY |
|    | G0 | G1 | G2 | G3 | G4 | G5 | G6 | G7 | G8 | G9 | G10 | G11 | SY |
| SY | H0 | H1 | H2 | H3 | H4 | H5 | H6 | H7 | H8 | H9 | H10 | H11 | LI |

LI ··· LEADIN    SY ··· SYNC

☐ NORMAL DATA    ▨ ERROR CORRECTING CODE

| SY | A11 | A10 | A9 | A8 | A7 | A6 | A5 | A4 | A3 | A2 | A1 | A0 |
| SY | B11 | B10 | B9 | B8 | B7 | B6 | B5 | B4 | B3 | B2 | B1 | B0 |
| SY | C11 | C10 | C9 | C8 | C7 | C6 | C5 | C4 | C3 | C2 | C1 | C0 |
| SY | D11 | D10 | D9 | D8 | D7 | D6 | D5 | D4 | D3 | D2 | D1 | D0 |
| SY | E11 | E10 | E9 | E8 | E7 | E6 | E5 | E4 | E3 | E2 | E1 | E0 |
| SY | F11 | F10 | F9 | F8 | F7 | F6 | F5 | F4 | F3 | F2 | F1 | F0 |
| SY | G11 | G10 | G9 | G8 | G7 | G6 | G5 | G4 | G3 | G2 | G1 | G0 |
| SY | H11 | H10 | H9 | H8 | H7 | H6 | H5 | H4 | H3 | H2 | H1 | H0 |

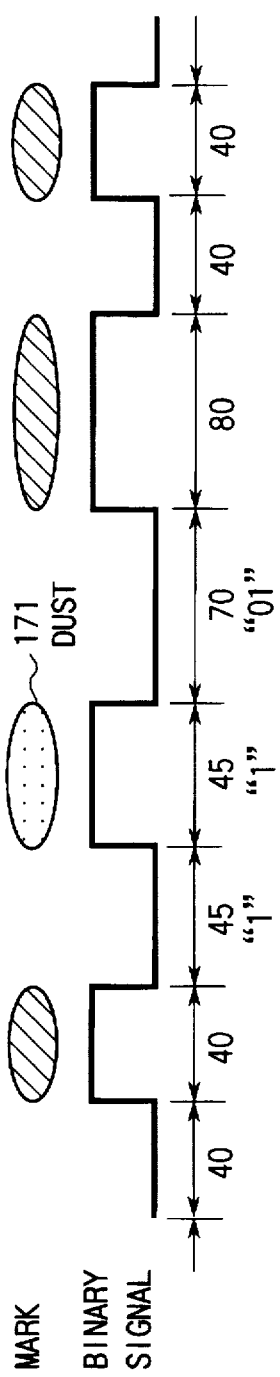
F I G. 17
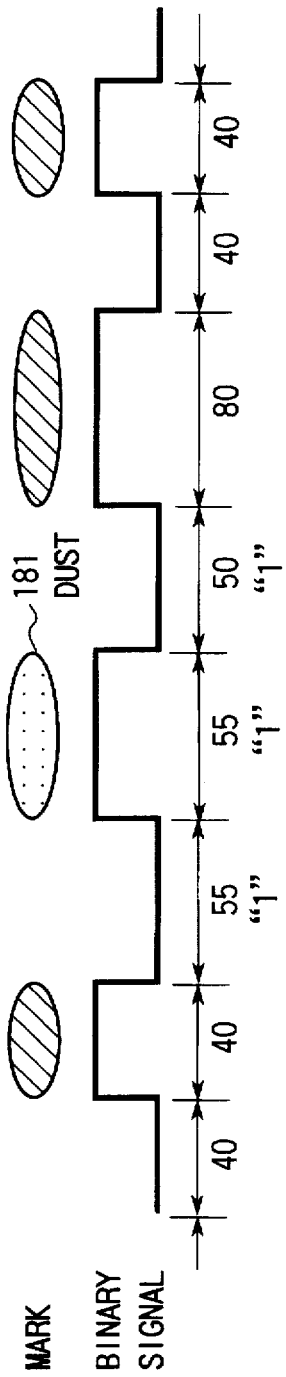
F I G. 18
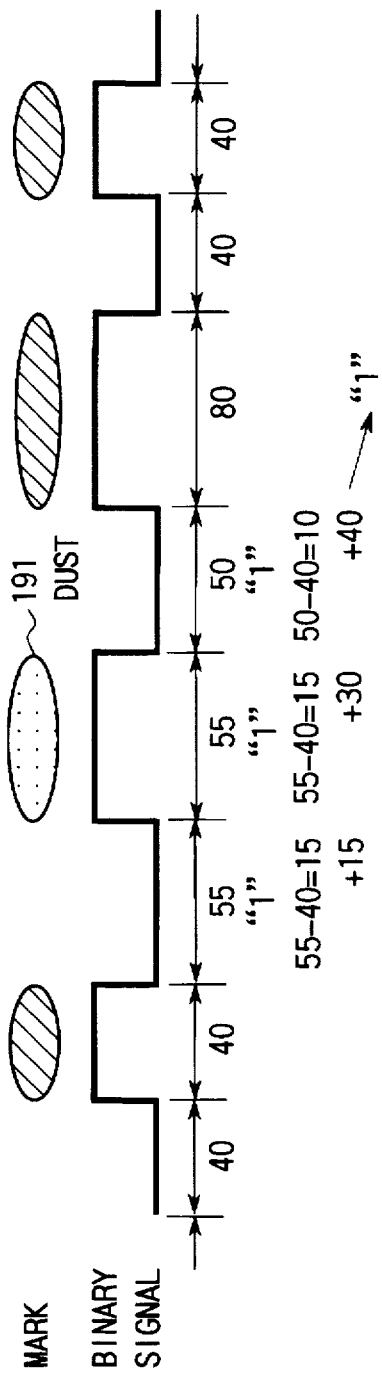
F I G. 19

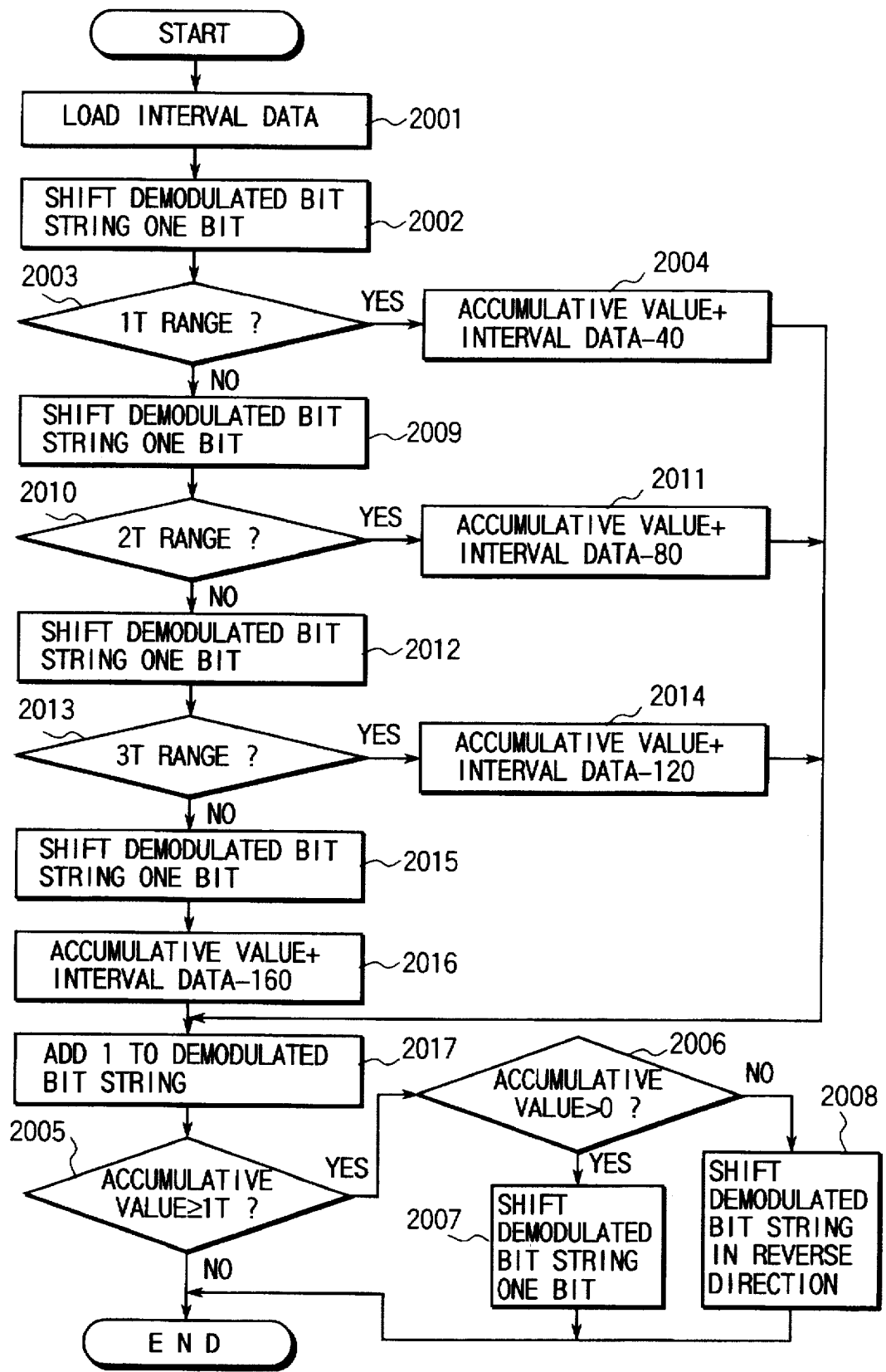
F I G. 20

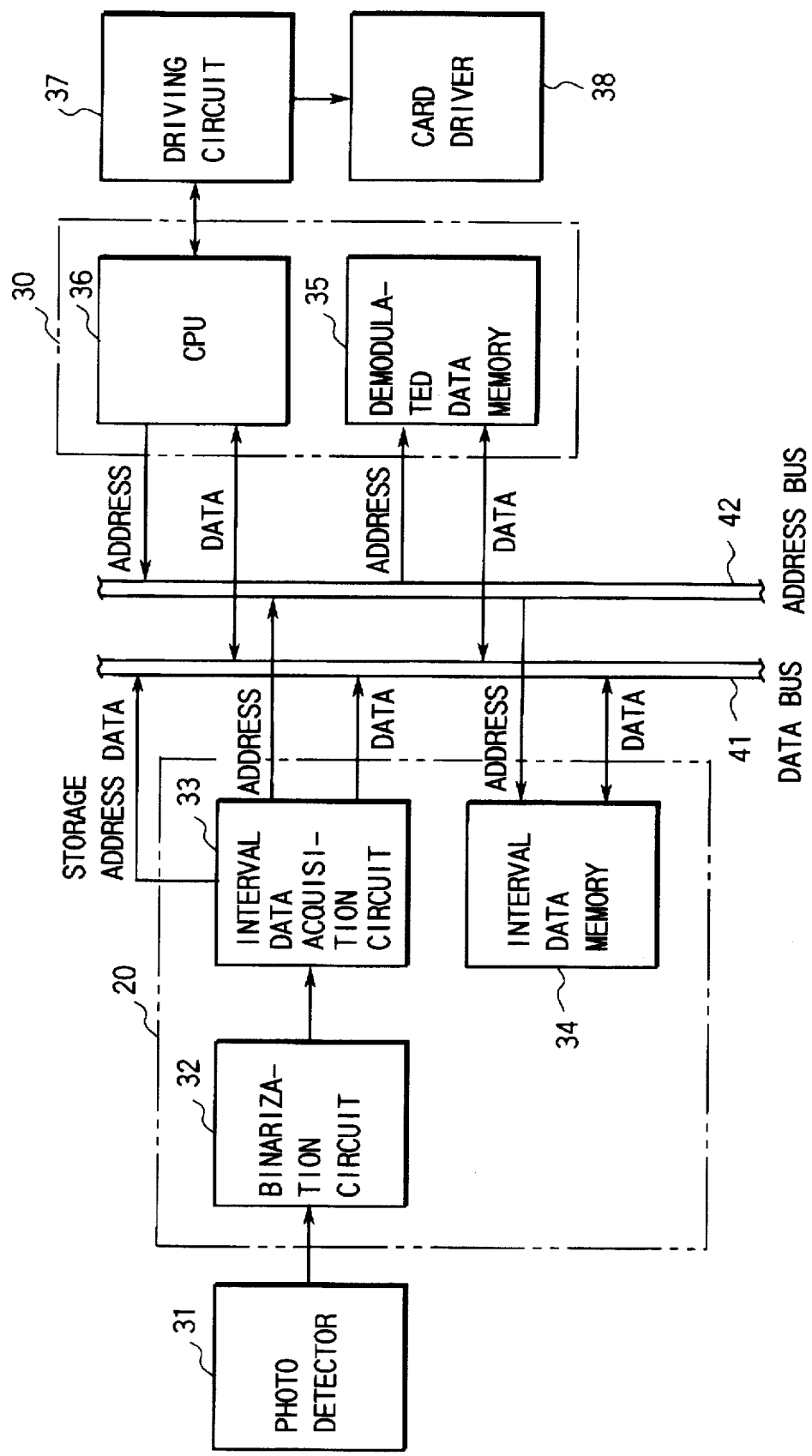
F I G. 21

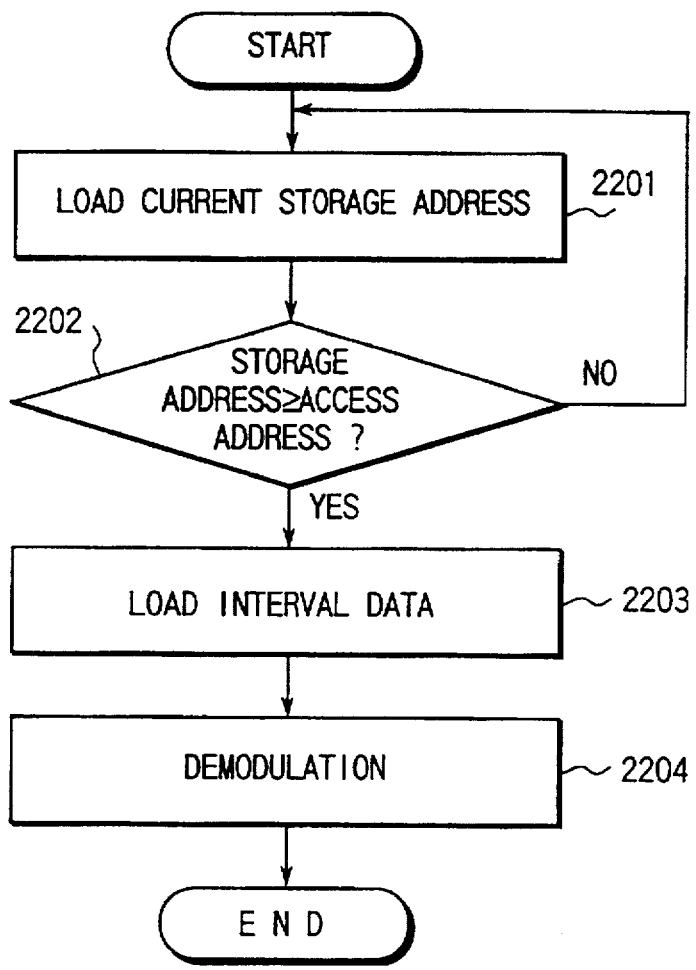
F I G. 2 2
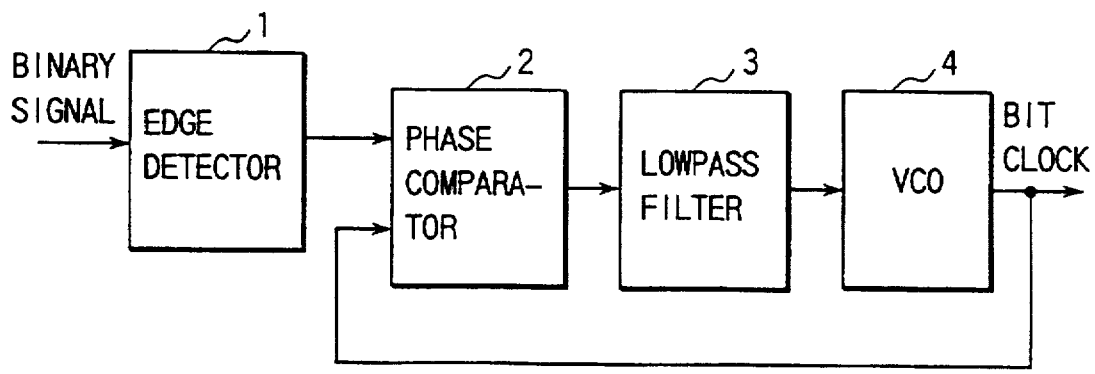
F I G. 2 4 (PRIOR ART)

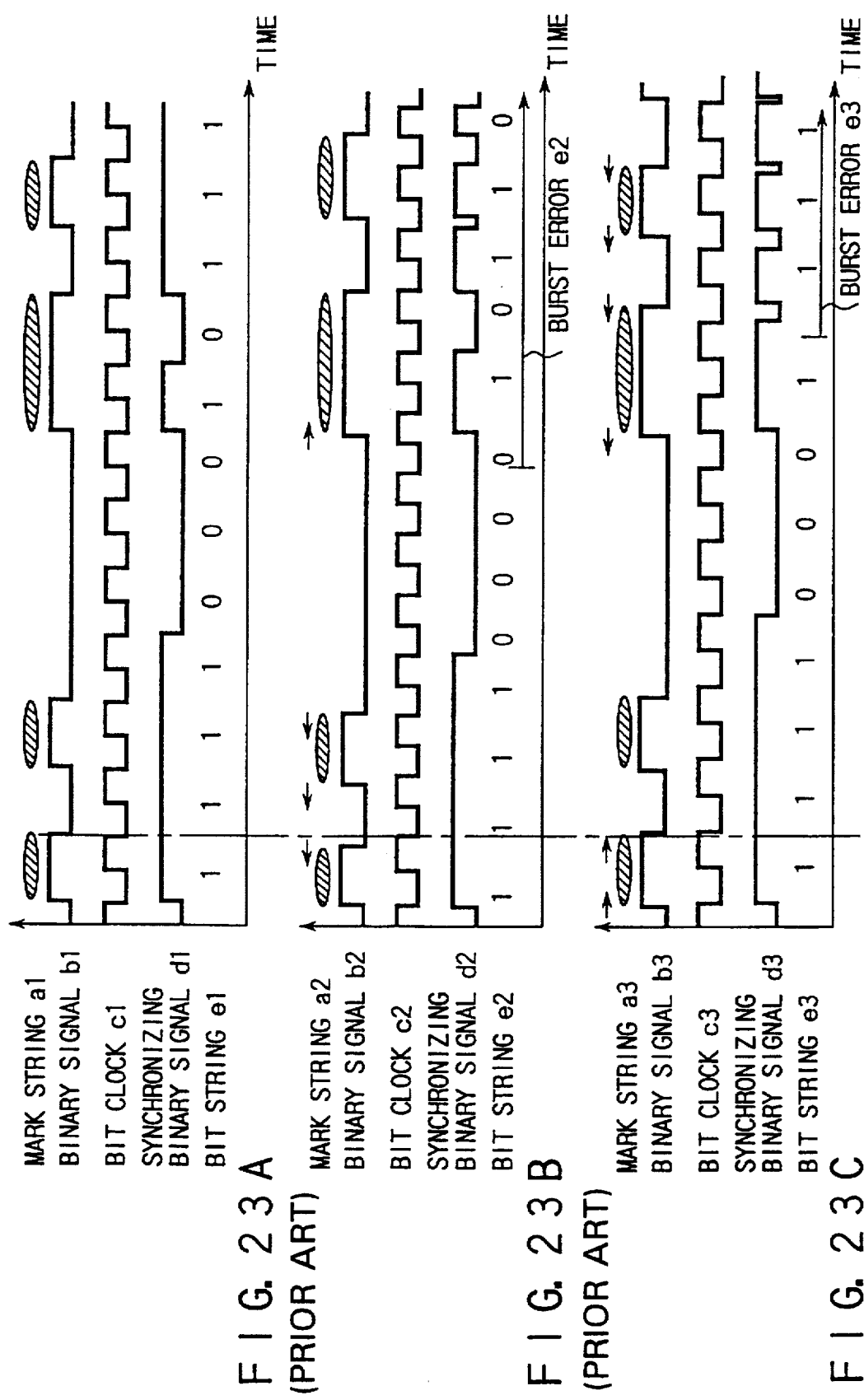

ns, 5,726,966

OPTICAL RECORDING MEDIUM REPRODUCING APPARATUS USING EDGE DETECTING TECHNIQUE

BACKGROUND OF THE INVENTION

1. Field of the Invention

The present invention relates to a demodulator for recovering information from an optical recording medium recorded with the information on its tracks in the form of marks (pits).

2. Description of the Related Art

As information recording media, conventionally optical disks and optical cards are widely known which are written onto and read from optically. Of these recording media, optical cards are about the size of plastic cards such as credit cards that have been widely used. The optical cards each have a storage capacity of three megabytes or more and hence are expected to be used as a portable optical recording medium.

With such optical cards, on a card-like substrate are formed a plurality of tracks parallel to one another and a plurality of track guides each separating adjacent tracks physically. Information recording onto an optical card thus arranged is made by irradiating each of the tracks with laser light modulated with information to be recorded to thereby form marks on the tracks physically or chemically. The playback of information from the optical card is performed by irradiating a desired track or tracks with laser light which is not so intense as to form marks on the tracks, receiving the reflected light with a photodetector, and subjecting an electrical signal from the photodetector to binarization, demodulation, etc.

Modulation schemes for recording marks on optical cards include self-clocked modulation such as (2, 7) RLL modulation, 8–10 modulation, MFM modulation, and so on. Demodulators for use with these modulation schemes are arranged to detect edges of a binary signal at which its polarity changes to generate a bit clock synchronized with the minimum data interval and then sample the binary signal with the bit clock to thereby extract a bit string representative of data.

FIGS. 23A, 23B and 23C are diagrams explanatory of the operation of recording onto an optical card according to the mark length recording scheme using the 8–10 modulation. FIG. 23A illustrates a relationship among a mark (pit) string a1, a binary signal b1, a bit clock C1 correspond to the binary signal b1, a synchronizing binary signal d1 for extracting a bit string, and a demodulated bit string e1. In the mark length recording scheme using the 8–10 modulation, a 1 in the bit string d1 corresponds to the inversion of a mark. Thus, the bit string e1 is extracted by sampling the synchronizing binary signal d1 in response to the rising edge of the bit clock c1 that rises when the polarity-inversed edge of the binary signal b1 is detected and then falls at the falling edge of a bit clock c1.

In the binary signal b1 corresponding to the mark string a1 on the optical card, jitter will occur at its edges or the edge interval serving as a reference will fluctuate because a variation in the moving speed of the optical card at playback time is superimposed on a variation in the moving speed at recording time. For this reason, the bit clock generator changes the period or phase of the bit clock to follow the jitter or the fluctuation of the edge interval.

FIG. 24 shows an arrangement of a VFO circuit for generate bit clock. This VFO circuit is composed of analog circuits. In the VFO circuit, an edge detector 1 detects edges of a binary signal a, and a phase comparator 2 makes a comparison between the phases of edges of the binary signal a and a bit clock output. An output voltage of the phase comparator 2 is applied through a lowpass filter 3 to a voltage-controlled oscillator (VCO) 4, so that the frequency of the bit clock c is changed to follow the fluctuation of the binary signal a.

In FIG. 23B, there is illustrated a relationship among a mark (pit) string a1, a binary signal b2, a bit clock c2 corresponding to the mark string a2, and a recovered bit train d2. In this figure, the mark length is shown changed in the decreasing direction by local jitter. If, when the VFO circuit described above is arranged to well follow local jitter, the mark length is changed by the local jitter in the decreasing direction as shown in FIG. 23B and the phase of the bit clock c2 changes accordingly, then a displacement of the bit clock will occur for the subsequent normal mark length. This may cause such a burst error e2 as shown in FIG. 23B.

FIG. 23C illustrates a relationship among a mark (pit) string a3, a binary signal b3, a bit clock c3 corresponding to the mark string a3, and a recovered bit string d3. In this figure, the mark length of the mark string a3 is shown changed in the increasing direction by local jitter. If, when the bit clock generator is arranged to little follow local jitter (as opposed to the above case), the mark length is changed by the local jitter in the increasing direction as shown in, for example, FIG. 23C and the phase of the bit clock c3 changes accordingly, then the bit clock will fail to follow the subsequent normal mark length. This may cause a burst error e2 as in the above case.

In general, an error correcting code is appended to data recorded on an optical card to allow original data to be restored even with the occurrence of some local demodulation errors. However, if such burst errors as described above occur, the number of occurrences of errors often exceeds the number of errors that the code can correct, failing to restore the original data.

For this reason, irrespective of whether they are of analog type or digital type, conventional bit clock generators have become equipped with various compensation circuits for various fluctuations of a binary signal. Thus, problems with the conventional bit clock generator are that the hardware scale and cost increase.

In recent years, a method is sometimes used which irradiates multiple tracks with light to record or reproduce information simultaneously for the purpose of improving the speed at which information is reproduced. With such a method, however, such a VFO circuit as described above and hardware dedicated to information demodulation for a predetermined recording method must be provided for each of tracks subjected to simultaneous reproduction. This results in a further increase in hardware scale and cost.

SUMMARY OF THE INVENTION

The object of the present invention is to provide a demodulator adapted for optical recording media which permits demodulated data to be produced in a stable manner.

According to the present invention, there is provided a demodulation device for use with an optical recording medium comprises an edge detector for detecting edges of a binary signal corresponding to marks written onto the optical recording medium as information; an edge interval measuring circuit for measuring a value for the interval between two successive edges detected by the edge detector; a storage device for storing a table that relates thresholds representing upper and lower limits on at least one of a length of the mark and an interval between the marks to demodulated bit strings; and a data converter for comparing an edge interval value obtained by the edge interval measuring circuit with the thresholds representing upper and lower limits to thereby determine one of corresponding a length of the mark and an interval between marks and obtain a demodulated bit string corresponding to the edge interval value measured from the table.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 shows an arrangement of an optical card in accordance with the present invention;

FIG. 3 shows a data arrangement of one sector of data after modulation in accordance with the present invention;

FIG. 4 shows an arrangement of a data conversion circuit in accordance with the present invention;

FIG. 5 shows an arrangement of the interval data acquisition circuit of FIG. 4;

FIG. 7 shows a correspondence between interval data and a demodulated bit string;

FIG. 9 shows a relationship between an arrangement of marks and a binary signal in accordance with the present invention;

FIG. 10 shows a relationship between an arrangement of marks and a binary signal in accordance with the present invention;

FIG. 11 shows a relationship between an arrangement of marks and a binary signal in accordance with the present invention;

FIG. 13 is a flowchart for the operation of the interval data acquisition circuit of FIG. 12;

FIG. 14 shows an arrangement of data after modulation in accordance with the present invention;

FIG. 16 shows an arrangement of data after modulation when a scan is made in the reverse direction;

FIG. 17 shows a relationship between an arrangement of marks mixed with dust and a binary signal in accordance with the present invention;

FIG. 18 shows a relationship between an arrangement of marks mixed with dust and a binary signal in accordance with the present invention;

FIG. 19 shows a relationship between an arrangement of marks mixed with dust and a binary signal in accordance with the present invention;

FIG. 20 is a flowchart illustrating the procedure of converting one piece of interval data stored in the interval data memory into a bit string in accordance with the present invention;

FIG. 21 shows an arrangement of a data conversion circuit in accordance with the present invention;

FIG. 22 is a flowchart for the demodulation of one piece of interval data stored in the interval data memory in accordance with the present invention;

FIGS. 23A, 23B and 23C are diagrams explanatory of recording information on an optical card in accordance with mark length recording scheme using 8-10 modulation; and FIG. 24 shows an arrangement of a VFO circuit for generating a bit clock.

DETAILED DESCRIPTION OF THE PREFERRED EMBODIMENTS

Figure 2:
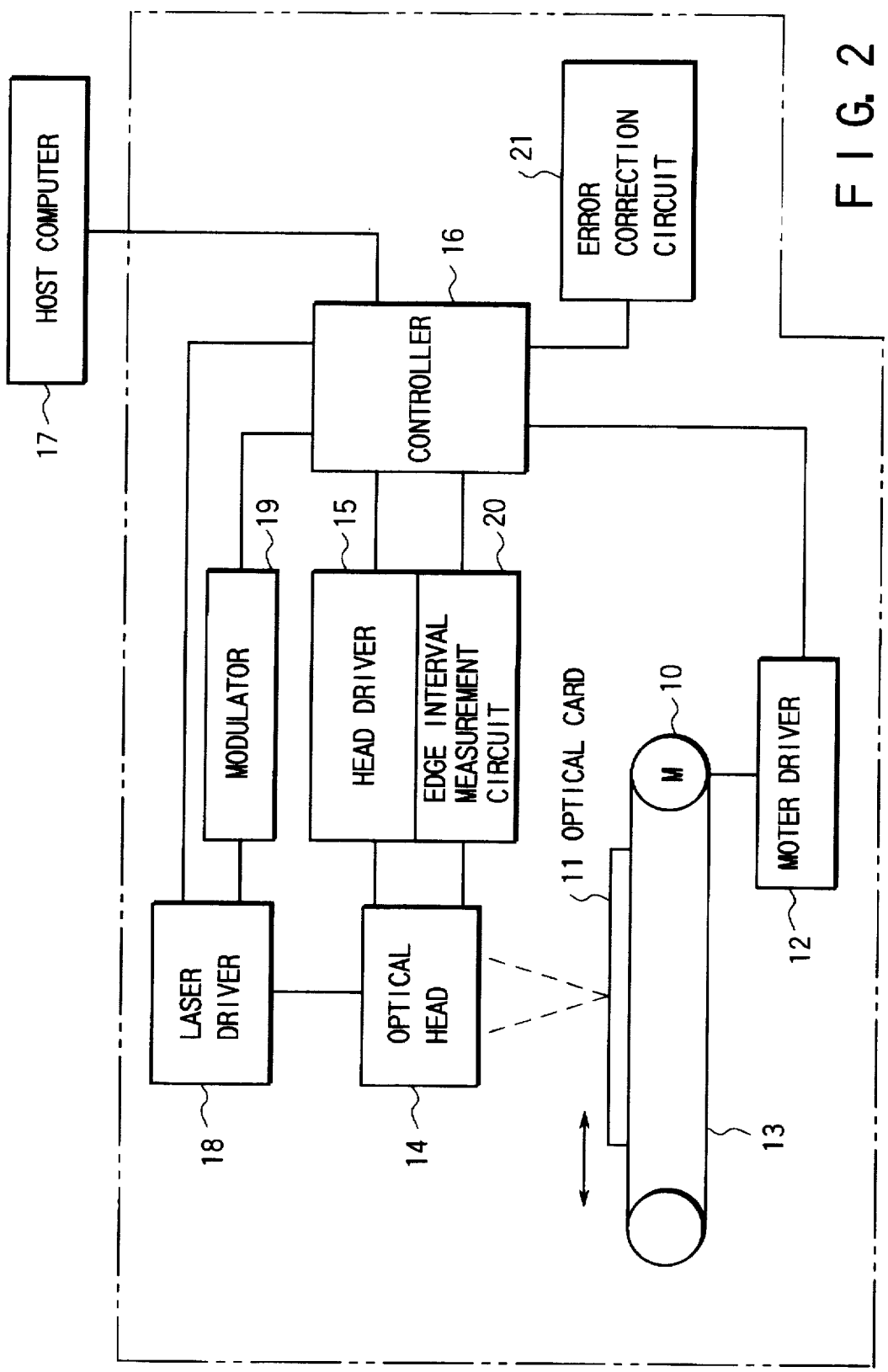
FIG. 2 is a schematic illustration of a recording and reproducing apparatus in accordance with the present invention.

Referring now to FIG. 1, an optical card 11 according to a first embodiment of the present invention has an optical recording area 111 on its substrate surface. As shown in an enlarged view A of a part 110 of the optical data recording area 111, on the recording area are formed a plurality of tracks 112 which are parallel to one another along a longitudinal line of the card and a plurality of track guides 114 each separating adjacent tracks 112 physically. Recording of information onto the optical data recording area 111 is made by emitting laser light from recording/reproducing apparatus to be described later onto the tracks 112 at an intensity to allow a thermal change to occur on the tracks to thereby form marks 113. On the other hand, the information is reproduced by emitting laser light which is not so intense as to cause a thermal change on the tracks onto the tracks and receiving reflected light whose intensity varies according to the presence or absence of the marks 113.

FIG. 2 shows an arrangement of the recording/reproducing apparatus which records information onto and reproduces information from the card 11. In FIG. 2, the optical card 11 is reciprocated in the direction parallel to the direction of the length of the tracks by a moving mechanism 13 equipped with a motor 10 driven by a motor driver 12. During the reciprocation, laser light is intermittently emitted from an optical head 14 to the optical card 11, whereby marks (pits) are formed on the tracks 112 of the optical data recording area 111. The edge interval measurement circuit 20 and controller 16 shown in FIG. 2 constitute a demodulator.

The motor driver 12 for reciprocating the optical card 11 and a head driver 15 for moving the optical head 14 are controlled by a controller 16 comprising a central processing unit (CPU). To the controller 16 are connected a host computer 17, a laser driver 18, a modulator 19, the head driver 15, an edge interval measurement circuit 20, a motor driver 12, and an error correction processing circuit 21. The modulator 19 is connected to the laser driver 18, while the edge interval measurement circuit 20 is connected to the optical head 14.

Next, the process of converting data to be recorded/reproduced into the form of marks by means of the recording/reproducing apparatus thus arranged will be described. First, data to be recorded is sent from the host computer 17 to the controller 16. This data is processed in units of a fixed number of bytes, the unit being normally called the sector. The controller 16 causes the error correction processing circuit 21 to subject the data to error correction coding and sends the data appended with error correcting codes to the modulator 19 as data before modulation. The controller 16 causes the modulator 19 to subject the data before modulation to digital modulation, such as 8–10 modulation.

The modulator 19 divides the data before modulation, i.e., the data to which the error correcting codes have been appended, into units called blocks and appends resynchronization data called "SYNC" between each block and before and after each sector. Further, the modulator 19 appends data, serving as a lead-in signal "LeadIn" for the bit clock generator, before and after each sector, thereby producing data after modulation.

FIG. 3 shows an example of a sector in the data after modulation. In the example of FIG. 3, a data arrangement of 8×4 bytes has its respective row and column extended with error correcting codes of four bytes and is then subjected to the 8–10 modulation. The above-described "LeadIN (LI)" and "SYNC(SY)" are appended to the data after modulation. With the 8–10 modulation, a 1 in a string of 1s and 0s in the data after modulation is made to correspond to a mark. To form a mark, the laser light emission time from the optical head 14 is controlled on the basis of a relationship between the driving speed of the optical card 11 and the mark length.

In demodulation, on the other hand, laser light is emitted by the laser driver 18 from the optical head 18 onto the optical card 11 while it is being moved. The optical head 14 receives reflected light the intensity of which varies according to the presence or absence of a mark, and the edge interval measurement circuit 20 converts the received reflected light into an electrical binary signal which takes either of two values of a 1 and a 0. In this case, as a correspondence exists between the bit string in the data after modulation and the light emission time at the time of recording, a correspondence exists between the time length of a binary signal and the bit string in the data before demodulation at the time of demodulation.

The binary signal is converted into the edge interval data by the edge interval measurement circuit 20 and stored in the interval data memory 34 as the edge interval data. This demodulation processing is performed for all the blocks within a sector, so that all edge interval data, including error correction coded data, are stored by the edge interval measurement circuit 20. Next, a procedure of converting a binary signal into data before demodulation will be described.

FIG. 4 shows an arrangement of a data conversion circuit, which comprises a photodetector 31, a binarization circuit 32, an interval data acquisition circuit 33, an interval data memory 34, a demodulated data memory 35, a CPU 36, a driving circuit 37, a card driver 38, a data bus 41, and an address bus 42. The binarization circuit 32, the interval data acquisition circuit 33 and the interval data memory 34 form the edge interval measurement circuit 20, and the CPU 36 and the demodulated data memory 35 form a data detector 30. The edge interval measurement circuit 20 and data detector 30 shown in FIG. 4 constitute a demodulator. The photodetector 31 shown in FIG. 4 is a part of the optical head 14 in FIG. 2. The data detector 30 in FIG. 4 is built in the controller 16 in FIG. 2. The driving circuit 37 and card driver 38 in FIG. 4 correspond to the motor driver 12 and motor 10 in FIG. 2, respectively.

The photodetector 31 is placed in the optical head 14 and connected through the binarization circuit 32 to the interval data acquisition circuit 33. The interval data acquisition circuit 33 and the interval data memory 34 are connected to the data bus 41 and the address bus 42. To the CPU 36 is connected the card driver 38 through the driving circuit 37. The CPU 36 and the demodulated data memory 35 are connected to the data bus 41 and the address bus 42.

As a modulation recording method, the first embodiment uses the mark length recording method based on 8–10 modulation codes. With the 8–10 modulation codes used with optical cards, the maximum number of consecutive 0s are set to three to reduce the effect of DC components. The minimum unit of mark length for a 1 in a bit string is represented by 1T. The maximum unit of mark length for "0001" in a bit string is represented by 4T. "01" in a bit string is represented by 2T, and "001" is represented by 3T.

In such an arrangement, the CPU 36 instructs the card driver 38 through the driving circuit 37 to move the optical card 11 relative to the photodetector 31. The photodetector 31 then detects reflected light from the optical card 11 whose intensity is modulated with the presence or absence of marks on the tracks and converts the analog light signal into an electrical signal, which is in turn applied to the binarization circuit 32.

The binarization circuit 32 converts an input signal from the photodetector 31 into a binary signal having a high level and a low level by, for example, slicing the input signal at a proper level and outputs it to the interval data acquisition circuit 33. The interval data acquisition circuit 33 counts the intervals between edges of the binary signal at which polarity changes using a high-frequency clock and then sequentially stores counts (hereinafter referred to as interval data) into the interval data memory 34 via the data bus 41.

The CPU 36 sequentially reads the interval data from the interval data memory 34 via the data bus 41 and then converts it into a bit string. The resulting bit strings are demodulated in accordance with modulation/demodulation rules for 8–10 modulation codes and the demodulated data are sequentially stored into the demodulated data memory 35 via the data bus 41.

Figure 6:
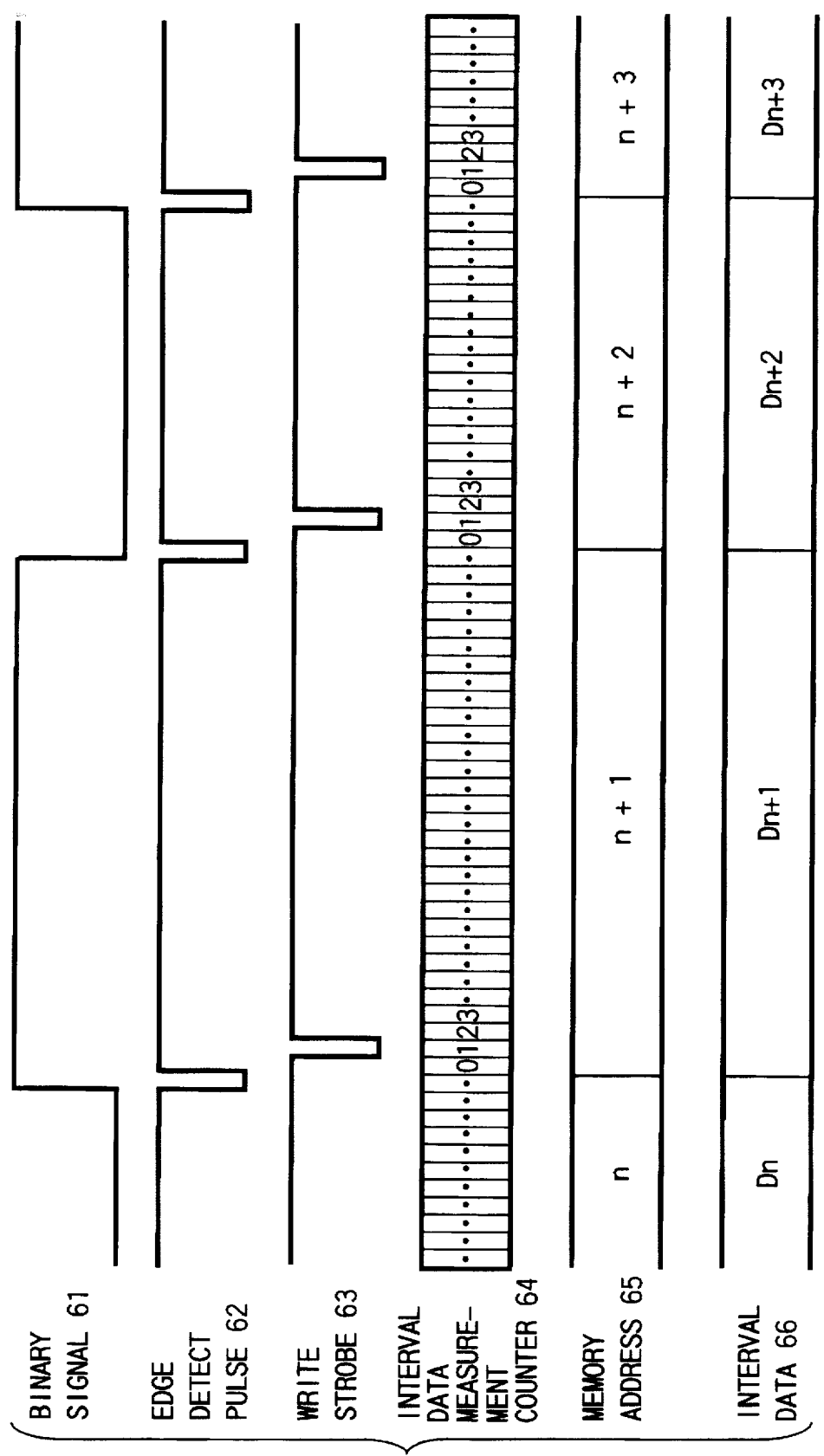
FIG. 6 is a timing diagram explanatory of the operation of the interval data acquisition circuit of FIG. 5.

FIG. 5 shows an arrangement of the interval data acquisition circuit 33, and FIG. 6 is a timing diagram for use in explanation of the operation of the circuit. The interval data acquisition circuit 33 comprises an edge detector 331, delay circuits 332 and 333, an address generating counter 334, an interval data measurement counter 335, and a latch circuit 336. The edge detector 331 is connected to the interval data memory 34 through the delay circuits 332 and 333 and directly connected to the latch circuit 336. Also, the edge detector 331 is connected to the address generating counter 334 and to the latch circuit 336 through the interval data measurement counter 335. The address generating counter 334 and the latch circuit 336 are connected to the interval data memory 34.

The edge detector 331 first detects the rising and falling edges of a binary signal 61 shown in FIG. 6 to produce edge detect pulses 62. Each of the edge detect pulses 62 is input to the interval data measurement circuit 335 as a reset pulse and to the latch circuit 336 as an enable pulse. Thus, interval data 66, which is a measured value obtained immediately prior to resetting of the interval data measurement counter 64, is latched by the latch circuit 336.

Each of the edge detect pulses 62 is applied to the address generating counter 334 as an enable pulse, so that the memory address 65 of the interval data 66 in the interval data memory 34 is incremented by one. In addition, each edge detect pulse 62 is delayed by the delay circuits 332 and 333 by a time interval corresponding to two periods of a system clock and then applied to the interval data memory 34 as a write strobe pulse 63. Although the edge detect pulse may be delayed by a time interval corresponding to one period of the system clock, it is delayed here by two periods long enough to ensure the memory setup time. Thus, the interval data 66 from the latch 336 is stored into the location in the interval data memory 34 addressed by the address generating counter 334 (memory address 65).

By repeating the above operations again and again, edge interval data are stored in the interval data memory 34 in sequence. Basically, the interval data acquisition circuit 33 can be constructed, as shown in FIG. 5, from counters and a latch and hence can be implemented very simply.

Next, the data demodulation method will be described. The data demodulation is performed by the CPU 36 using software, not by dedicated hardware. At the termination of a scan of one track of the optical card 11, interval data for one track have been successively stored in the interval data memory 34.

Here, a description is given of a correspondence between interval data read from the interval data memory 34 and a bit string. For example, if the minimum mark length, i.e., 1T, is 4 μm, the average driving speed for the optical card 11 is 100 mm/s, and the clock frequency for edge interval measurement is 1 MHz, then a standard value for a normal interval of 1T will correspond to 40 clock pulses, that is, 39 in count value. With similar calculations, standard values for 2T, 3T and 4T will be 79, 119, and 159, respectively.

FIG. 7 shows a correspondence between interval data and demodulated bit strings in the first embodiment. By placing each standard value at the center, a table of correspondence between interval data and demodulated bit strings can be created as shown in FIG. 7. This correspondence table is stored in a correspondency table storage memory (for example, working memory or program memory for storing programing in CPU 36) (not shown) and contains fields of "mark length", "numerical range", and "demodulated data". For the mark length "1T", the numerical range is 20 to 59 and the demodulated data is 1. For the mark length "2T", the numerical range is 60 to 99 and the demodulated data is 01. For the mark length "3T", the numerical range is 100 to 139 and the demodulated data is 001. For the mark length "4T", the numerical range is 140 to 179 and the demodulated data is 0001.

Figure 8:
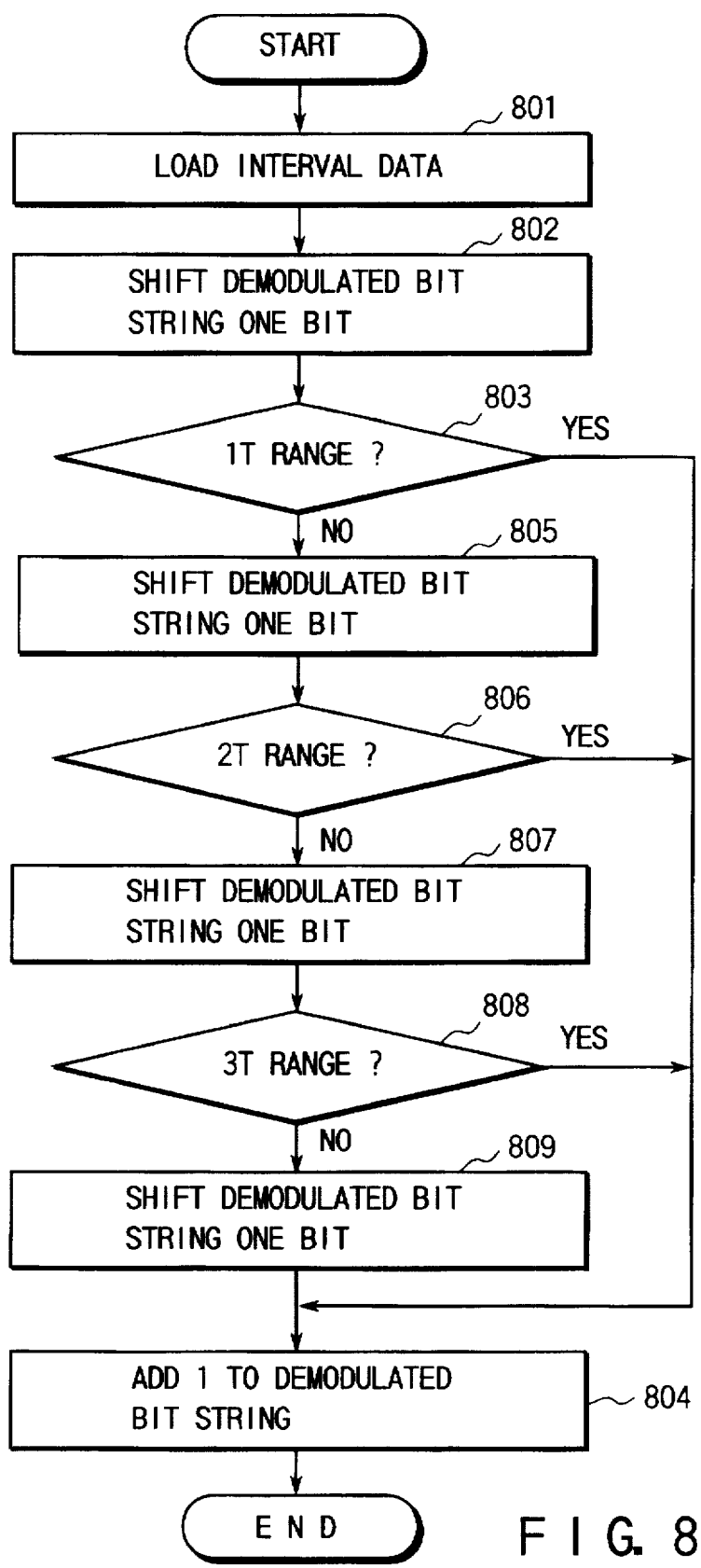
FIG. 8 is a flowchart illustrating the procedure of converting one piece of interval data stored in the interval data memory into a bit string in accordance with the present invention.

FIG. 8 is a flowchart for the CPU 36 procedure of converting one piece of interval data stored in the interval data memory 34 into a bit string. In the first place, in step 801, the CPU 36 loads interval data from the interval data memory 34 in the order in which they were stored. Next, a demodulated bit string is shifted one bit position by the CPU 36 in step 802. In subsequent step 803, a decision is made as to whether or not the interval data is within the numerical range for the mark length 1T. If the decision is that the interval data is within the numerical range of 20 to 59 for the mark length 1T, then, in step 804, a 1 is added to the demodulated data which has been shifted left one bit position, thereby demodulating the demodulated data "1".

If, on the other hand, the decision in step 803 is that interval data is not in the range for the mark length 1T, then the interval data is further shifted one bit position in step 805 and a decision is made as to whether or not the interval data is in the numerical range for the mark length 2T. If the interval data is in the range 60 to 90 for the mark length 2T, then a 1 is added to the bit string that has been shifted left one bit position in step 804 to thereby demodulate the demodulated data 01.

If the decision in step 806 is that the interval data is not in the range for the mark length 2T, then the interval data is further shifted one bit position in step 807 and a decision is made as to whether or not the interval data is in the numerical range for the mark length 3T. If, on the other hand, the interval data is in the range 100 to 139 for the mark length 3T, then a 1 is added to the bit string that has been shifted left one bit position in step 804 to thereby demodulate the demodulated data 001.

When, in step 808, the interval data is not in the range for the mark length 3T, the interval data is in the numerical range for the mark length 4T, i.e., in the range 140 to 179 shown in FIG. 7. Thus, the demodulated bit string is further shifted left one bit position in step 809 and a 1 is added to the resulting bit string in step 804 to demodulate the demodulated data 0001.

By the above operations, examinations are made in sequence until one of the mark lengths 1T to 4T that matches the interval data is found. The demodulated bit string is shifted to the left the number of times the examinations were made and finally a 1 is added to the resulting bit string, thereby converting the interval data to a demodulated bit string.

FIGS. 9, 10 and 11 each show a relationship between a mark arrangement and a binary signal. The results of conversion of the same binary signals as described in connection with FIGS. 23A, 23B and 23C to interval data in accordance with the first embodiment are shown in FIGS. 9, 10 and 11, respectively. FIG. 9 shows the case where the mark length is normal, FIG. 10 shows the case where the mark length is changed to reduce by local jitter, and FIG. 11 shows the case where the mark length is changed to increase by local jitter. In FIG. 9, the demodulated data are "1", "1", "0001", "01", "1", and "1", which correspond with the numerical ranges of the binary signal, 40, 40, 160, 80, 40, and 40, respectively. In FIG. 10, the demodulated data are "1", "1", "0001", "01", "1", and "1", which correspond with the numerical ranges of the binary signal, 38, 38, 170, 76, 55, and 55, respectively. In FIG. 11, the demodulated data are "1", "1", "0001", "01", "1", and "1", which correspond with the numerical ranges of the binary signal, 40, 40, 152, 76, 38, and 38, respectively.

That is, the demodulated data shown in FIGS. 10 and 11 are identical to the demodulated data shown in FIG. 9. According to the first embodiment, as shown in FIGS. 10 and 11, one edge interval can be demodulated without bit displacement as it would occur if a bit clock were used. This is because jitter of several preceding edge intervals and variations in the card driving speed have no effect on that demodulation.

The demodulated bit string thus obtained is stored in the demodulated data memory 35 shown in FIG. 4. This storage method will be described next. First, the CPU 36 searches through the demodulate bit string for "SYNC". With the 8–10 modulation, the bit string for "SYNC" is either 1100010001 or 0100010001, which will never appear in the process of normal modulation. When a demodulated bit string matches SYNC, the CPU 36 converts a bit string of 10 bits that immediately follows the SYNC into a corresponding data byte of eight bits in accordance with the 8–10 modulation rules. The resulting data byte is stored in the demodulated data memory 35 via the data bus 41. The CPU 36 repeats this operation until the next SYNC appears. The CPU 36 further repeats this processing for one sector. Thus, the demodulated data is stored in the data memory 35 with the SYNC and LeadIn removed.

There are several types of configurations for sectors recorded on the tracks of an optical card 11. Their size and their number and position on tracks have been defined. Thus, not only a configuration of one sector/one track but also a configuration of several tracks/one track exists. The minimum gap between sectors is on the order of 0.65 mm. If, in this case, the standard moving speed of the card is 100 mm/s and the measurement clock frequency is 1 MHz, then the interval data value will be 6499.

Assume here that the interval data measurement counter 335 in the interval data acquisition circuit 33 shown in FIG. 5 is an 8-bit counter and the gap between sectors is 0.65 mm. Then, for the 0.65 -mm gap, the counter will repeat an operation of counting up to 256 (255 in count value) and then overflowing to return to 0. Since 256×25+99=6499, 99 is obtained as interval data after 25 occurrences of overflow. As shown in FIG. 7, 99 is in the numerical range for mark length 2T. Thus, the CPU 36 will obtain the demodulated data 01.

The on-track sector location is normally specified by two places of decimals (units: mm). For this reason, in order to perform demodulation using dedicated hardware in real time, it is required to know the sector location accurately during the movement of the optical card. To this end, a scaler having a high resolution required and a counter will become necessary. However, the use of the high-resolution scaler increases cost.

Figure 12:
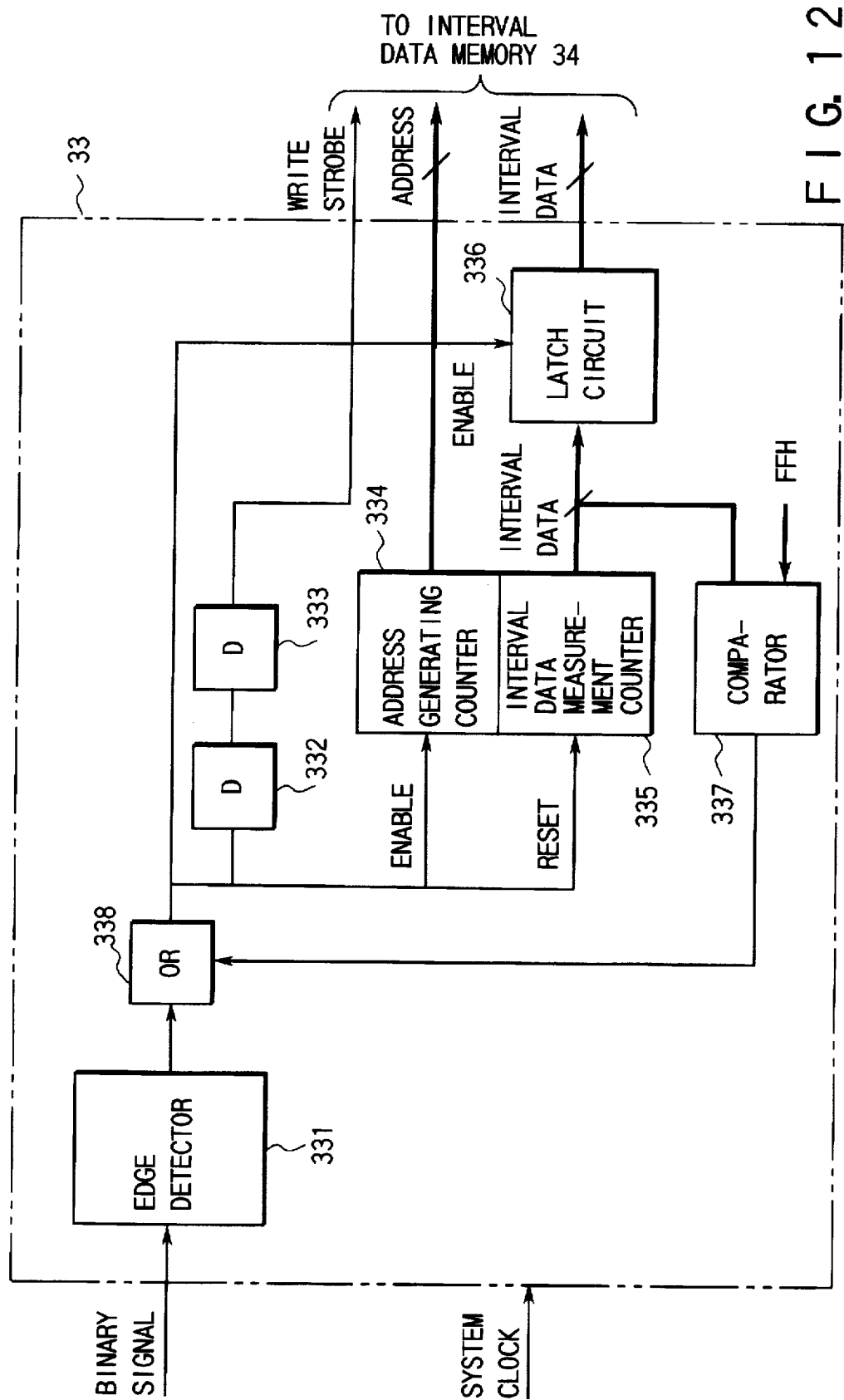
FIG. 12 shows a modification of the interval data acquisition circuit of the present invention.

FIG. 12 shows an interval data acquisition circuit 330, which is a modification of the interval data acquisition circuit 33 of FIG. 5. In this figure, like reference numerals are used to denote corresponding parts to those of FIG. 5. The arrangement of FIG. 12 differs from that of FIG. 5 in that a comparator 337 and an OR gate 338 are added. The OR gate 338 connects the output of the edge detector 331 to the latch 336, the delay circuit 332, the address generating counter 334, the interval data measurement counter 335, and the comparator 337. The comparator 337 makes a comparison between the full-scale count FFH of the interval data measurement counter 335, i.e., 255 (in the case of 8-bit counter) and a count in that counter. The upper limit value of the range of the interval data for the mark length 4T is set to have a sufficient margin for 255. That is, the interval data, 255, is not appeared at a region other than the gap between sectors.

When the counter 335 reaches the full-scale count 255, the address generating counter 334 is incremented by one and the interval data, 255, is latched by the latch circuit 336. The counter 335 is then reset to zero. The interval data of 255 is stored in the interval data memory 34. In the gap between sectors, erroneous interval data will not be stored because the counter overflows. The CPU 36 can recognize the gap between sectors on the interval data memory 34 by detecting an area in which the interval data of 255 appears in succession or an area in which there are many pieces of interval data of 255. Conversely, the CPU 36 will recognize data areas on the interval data memory 34 by detecting areas in which no or little interval data of 255 exists.

FIG. 13 is a flowchart illustrating the operation of the interval data acquisition circuit 330. In demodulation of one track on the optical card 11, the CPU 36 initializes the number of sectors to zero in step 1301 and then accesses pieces of interval data in the interval data memory 34 in sequence. The CPU 36 searches for a gap between sectors in step 1302 and then searches for a non-gap in step 1303. In subsequent step 1304, the CPU 36 finds the beginning of a sector to demodulate the sector. In subsequent step 1305, the number of sectors is incremented by one. The steps 1302 to 1305 are repeated again and again until the number of sectors is recognized to correspond to one track in step 1306, whereby the sector location is recognized without physical positioning of the sector area.

In the above description, when speed variations of the optical card 11 at the time of reading interval data and speed variations at the time of writing occur in the same direction, it may occur, as a result of a window margin being exceeded, such a situation that the mark interval which should have been recorded in mark length 3T is observed in the range for mark length 4T at the time of recording. In such a case, demodulating the interval data for 4T as data for 3T would be unnatural and adversely affect normal demodulation. For this reason, normally bit displacements occur, so that succeeding data results in a burst error that cannot be corrected. In this case, retry becomes necessary. Normally, retry is made with the card scanning direction reversed. The reason is described below.

FIG. 14 shows an arrangement of data after modulation. In an optical card, the data arrangement of a sector in which error correcting codes are appended to 32-byte user data becomes as shown in FIG. 14. In this arrangement, 4-byte error correcting codes that permit double correction are appended to each of rows and columns of a 32=8×4 data matrix.

In recording, such data is recorded on a track in the sequence of

LI-SY-A0-A1-....-A10-A11-SY-B0-....-B1-....-H10-H11-SY-LI

Figure 15:
FIG. 15 shows an arrangement of data after modulation in which errors occur.

FIG. 15 shows an arrangement of data after modulation when errors occur. In this figure, there is illustrated a data arrangement after demodulation in which, when a scan is made in the forward direction, burst errors occur due to C2 and E3 (after that, they are subjected to synchronous recovery) and when the burst errors are not occurred on H9, H10, and H11 but local errors are generated. In this case, three errors will occur in each of the ninth column 151, the tenth column 152 and the eleventh column 153, which considerably increases the possibility of incapability of error correction.

FIG. 16 shows an arrangement of data after modulation when a scan is made in the reverse direction. In this figure, there is illustrated a data arrangement after demodulation in which, when a scan is made in the reverse direction, bit displacements occur due to C2 and E3 and errors occur on H9, H10, and H11. In this case, three or more errors do not occur in each column, which will increase the possibility of success in error correction. For this reason, when error correction cannot be made, it is effective to make a retry with the scanning direction reversed.

With the conventional bit-clock-based system, in order to make a retry in the reverse direction, it is naturally required to move the card in the reverse direction for demodulation. Thus, an additional time of several hundreds of milliseconds will be needed. In contrast, in the first embodiment that retains interval data in the interval data memory 34 and demodulates the data using software, a scan in the reverse direction is made by simply loading the interval data stored in the memory 34 in the order opposite to the order in which they are stored, not by actually moving the optical card. Thus, a retry based on memory access can be made faster than the conventional retry requiring the optical card to be scanned.

Here, the algorithm used in the CPU 36 for the process of demodulating interval data of 39 as the mark length 1T is as follows:

step 1: load interval data from the interval data memory 34
step 2: the numerical range of the interval data>=20 ?
step 3: if Yes in step 2, the numerical range of the interval data<=59 ?
step 4: if Yes in step 3, set a 1 as demodulated data
step 5: store the demodulated data "1" in the demodulated data memory 35

Thus, the interval data of 39 can be demodulated as 1T.

The amount of processing required with the CPU 36 for demodulation would be at most 50 steps in total even if each of steps 1 to 5 should need 10 substeps. The maximum number of bits of data for one track is 1680 bytes, or 16800 bits, including error correcting codes and hence 16800×50= 840000 cycles result. Assuming one cycle of the CPU 36 to be 100 ns, the processing time required will be 84 msec. However, with the prior art in which the optical card is scanned, 80 mm/100 mm/s=800 msec is required. Thus, it will be understood that the CPU-based processing permits interval data to be demodulated in a very short time. In addition, the CPU-based processing requires no driving of the optical card, thus achieving power saving.

To improve the speed at which information is reproduced, use is sometimes made of a method which irradiates a plurality of tracks with light and reproduces information from each track simultaneously. In such a case as well, the CPU 36 simply performs processing on interval data for a plurality of tracks in the interval memory 34 to thereby obtain demodulated data. Thus, the circuit scale can be decreased significantly and products can be manufactured at low cost in comparison with the system which needs as many bit clock generators and pieces of hardware dedicated to demodulation as there are tracks.

Note that the recording/reproduction apparatus may be provided with as many photodetectors 31 and edge interval measurement circuit 20 as there are tracks on the optical card 11 each of which is read from simultaneously. Each edge interval measurement circuit 20 measures the interval between edges on the basis of edges detected by a corresponding one of the photodetectors 31. In this case, the data detector 30 will perform the same processing as described above for each track.

In the above description, as the modulation recording method use is made of the mark length recording method based on 8–10 conversion codes. As an alternative, an inter-mark recording method, such as (2, 7) RLL modulation, MFM modulation or the like, may be used. In this case, unlike the mark length recording method, the interval between the edges of the marks is not measured. The interval between a predetermined position on the mark and a predetermined position on the next mark is measured. Specifically, the output from the photodetector is differentiated, and the obtained differential signal is binarized with respect to a predetermined comparison level, and the rising edge of the binary signal is detected. Subsequently, like the first embodiment, inter-mark distance is found by the interval data acquisition circuit. The correspondency table storage memory stores the upper limit value and the lower limit value of the inter-mark distance.

According to the first embodiment, the mark length or the spacing between marks is determined on the basis of the edge interval values of marks written onto an optical recording medium as information and a demodulated bit string is produced accordingly, permitting stable demodulated data to be obtained even if local jitter occurs.

So far, a description was given of a demodulation method which is adapted to the case where no dust or flaw is present on an optical card. However, a binary signal may be output erroneously due to the presence of dust on an optical card. With the conventional bit-clock-based system, bit displacements become even easier to occur because not only speed variations and jitter but also dust and flaw have effects on demodulation processing.

A second embodiment of the present invention will be described hereinafter.

FIGS. 17, 18 and 19 each show a relationship between marks mixed dust and a binary signal. For example, as shown in FIG. 17, when a binary signal is output in a state where dust 171 clings to an optical card in an interval which originally should be the mark length 4T, the mark interval that must be converted to 0001 is erroneously converted to 1101. This is because the original 4T interval is divided into a 1T interval (45), a 1T interval (45), and a 2T interval (70) in the binary signal. In this case, however, the original 4T interval is merely converted to 4-bit data. No burst error due to bit displacement occurs and the error remains local. Thus, there is the possibility of success in error correction (In the case of H9, H10, H11 shown in FIG. 15).

On the other hand, when dust 181 clings to the optical card in the 4T interval as in FIG. 17 but in a slightly different location as shown in FIG. 18, the 4T interval is divided into a 1T interval (55), a 1T interval (55) and a 1T interval (50). That is, the original 4T interval is merely converted to 3-bit data. Thus, a burst error due to bit displacement will occur because the interval that should originally be converted to 4-bit data is converted to 3-bit data.

Assuming here that the average moving speed of the optical card is equal to a standard value, the total sum of interval data remains unchanged irrespective of whether or not a speed variation, jitter, dust, or the like is encountered in the middle of movement. Thus, the second embodiment uses the difference between interval data and the standard value as well in converting the interval data into a bit string.

FIG. 20 is a flowchart for the conversion of one piece of interval data stored in the interval data memory 34 shown in FIG. 4 into a bit string by the CPU 36 in accordance with the second embodiment. First, in step 2001, the CPU 36 loads interval data from the interval data memory 34 via the data bus 41. Next, in step 2002, the CPU 36 shifts a demodulated bit string for the loaded interval data one bit position and, in subsequent step 2003, makes a decision as to whether or not the interval data falls within the numerical range for the mark length 1T.

If the decision is that the interval data falls within the numerical range for 1T, then, in step 2004, an error between the interval data and the standard value 40 of the numerical range of 20 to 59 for 1T is accumulated with a sign. That is, the new error is added to an accumulative error obtained up to this point. Next, in step 2017, a 1 is added to the demodulated bit string. When the new accumulative error value is found in step 2005 to be the 1T standard value or more and the sign of the accumulative value is found to be plus in step 2006, the demodulated bit string is shifted one bit position and one bit of data (a 1 or a 0) is added in step 2007. If, on the other hand, the decision in step 2006 is that the sign of the accumulative value is minus, then the demodulated bit string is shifted one bit position in the reverse direction and one bit of data is removed in step 2008.

If, on the other hand, the decision in step 2003 is that the interval data is not within the numerical range for 1T, the demodulated bit string is shifted one bit position in step 2009 and a decision is made as to whether or not the interval data falls within the numerical range for 2T in step 2010. If the decision is that the interval data falls within the numerical range for 2T, then, in step 2011, an error between the interval data and the standard value 80 of the numerical range of 60 to 99 for 2T is accumulated with a sign. That is, the new error is added to the accumulative error obtained up to this point. Next, in step 2017, a 1 is added to the demodulated bit string. After that, steps 2005 to 2008 are carried out.

If, on the other hand, the decision in step 2010 is that the interval data is not within the numerical range for 2T, the demodulated bit string is shifted one bit position in step 2012 and then a decision is made as to whether or not the interval data falls within the numerical range for 3T in step 2013. If the decision is that the interval data falls within the numerical range for 3T, then, in step 2014, an error between the interval data and the standard value 120 of the numerical range of 100 to 139 for 3T is accumulated with a sign. That is, the new error is added to the accumulative error obtained up to this point. Next, in step 2017, a 1 is added to the demodulated bit string. After that, steps 2005 to 2008 are carried out.

If, on the other hand, the decision in step 2013 is that the interval data is not within the numerical range for 3T, the demodulated bit string is shifted one bit position in step 2015 and then, in step 2016, an error between the interval data and the standard value 160 of the numerical range of 140 to 179 for 4T is accumulated with a sign. That is, the new error is added to the accumulative error obtained up to this point. Next, in step 2017, a 1 is added to the demodulated bit string. After that, steps 2005 to 2008 are carried out.

By performing the above operations, the interval data loaded is examined for a match in mark length in the order of 1T, 2T, 3T, and 4T. The demodulated bit string is shifted to the left each time mismatch occurs and is added with a 1 at the last stage, thereby converting the interval data to a demodulated bit string.

FIG. 19 is a diagram for use in explanation of demodulation of the same interval as in FIG. 18 in accordance with the method described above. The initial interval data "5538 is converted to 1T and then the difference between 55 and 40 (the standard value for 1T), i.e., 55−40=+15, is obtained as an error. Likewise, the next interval data "55" is converted to 1T and then an error (55−40=+15) is obtained. This error is added to the immediately preceding error. That is, the accumulative error reaches 15+15=+30. The next interval data "50" is converted to 1T and then an error of +10 (=50−40) is obtained, which is then added to the accumulative error to obtain 30+10=+40. That is, at this point the accumulative error becomes just equal to the standard value of 1T. Thus, one bit of data (a 0 or a 1) is inserted into the end of the demodulated bit string. The accumulative error −40 is made a new accumulative error, which is then used to prevent bit displacements from occurring.

As described above, according to the second embodiment, bit displacements due to dust and the like become difficult to occur, increasing the possibility of success in error correction of data after demodulation.

In the description given so far, demodulation is performed after the termination of a scan of an optical card. For this reason, when multiple tracks are reproduced simultaneously and the settling time for stopping and reversing the optical card is shorter than the demodulation time for all the tracks, a shift cannot be made to the next scan. In such a case, a real-time demodulation device equipped with a demodulator based on dedicated hardware may be more favorable in terms of the speed of reproduction.

On the other hand, in a family of circuits for card driving, focus tracking and the like (hereinafter referred to as driving circuits), digital servo systems using DSP have been becoming the mainstream in recent years. With the digital servo, a CPU merely sends a command to drive a card to DSP, and it is the DSP that actually drives the card. While the card is being moved at a constant speed in particular, therefore, the CPU is idle or in the wait sate. Thus, a third embodiment is arranged to permit the CPU to demodulate interval data during its waiting time.

FIG. 21 shows an arrangement of a data conversion circuit according to the third embodiment of the present invention. In this figure, like reference numerals are used to denote corresponding parts to those in FIG. 4. In the arrangement of FIG. 21, the CPU 36 can read storage address data from the interval data acquisition circuit 33 via the data bus 41. The CPU 36 first instructs the driving circuit 37 to drive a card and then the interval data acquisition circuit 33 to initiate operation. The interval data acquisition circuit 33 stores interval data acquired in an ascending order of addresses (0, 1, 2, ...) into the interval data memory 34 via the data bus 41 in sequence. Meanwhile, the CPU 36 is placed in the wait state and hence starts demodulation.

FIG. 22 is a flowchart for the demodulation of one piece of interval data stored in the interval data memory 34 by the CPU 36. Before loading the interval data, in step 2201, the CPU 36 loads the current storage address in which the interval data has been stored by the interval data acquisition circuit 33 via the data bus 41.

Next, in step 2202, the CPU 36 makes a comparison between an access address into which the interval data is to be loaded and the stored address read just before to make a decision as to whether or not the access address is greater than the stored address ("the stored address≧the access address" or not). If the stored address is not greater than the stored address, then the CPU 36 loads the interval data in step 2203 and then demodulates the interval data in step 2204. If, on the other hand, the stored address is exceeded by the access address, then the CPU 36 is placed in the wait state until the stored address becomes greater than or equal (the stored address≧the access address) to the access address. Alternatively, the status of the servo system may be monitored.

By repeating the above operation again and again, data stored in the memory can be demodulated in semireal time, as it were. Thus, the reproduction speed can be increased up to the same level as when dedicated hardware is used.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. A demodulation device for use with an optical recording medium comprising:

edge detecting means for detecting edges of a binary signal corresponding to marks written onto said optical recording medium as information;

edge interval measuring means for measuring a value for the interval between two successive edges detected by said edge detecting means;

storage means for storing a table that relates thresholds representing upper and lower limits on at least one of a length of the mark and an interval between the marks to demodulated bit strings; and data conversion means for comparing an edge interval value obtained by said edge interval measuring means with said thresholds representing upper and lower limits to thereby determine one of a corresponding length of the mark and an interval between marks and obtain a demodulated bit string corresponding to said edge interval value measured from said table.

2. The demodulation device according to claim 1, wherein said data conversion means includes means for adding each difference between an edge interval value measured by said edge interval measuring means and a standard value for said edge interval value measured with a plus or minus sign and adjusting the number of bits of a demodulated bit string to which said edge interval is converted when the result of said addition is a reference value or more.

3. The demodulation device according to claim 1, further comprising second storage means for storing edge interval values measured by said edge interval measuring means in time sequence, and wherein said data conversion means includes means for monitoring addresses in said second storage means into which said edge interval values are loaded and reading said edge interval values from said second storage means so that an address in said second storage means from which an interval value is being read will not exceed an address into which an interval value is being stored.

4. The demodulation device according to claim 2, further comprising second storage means for storing edge interval values measured by said edge interval measuring means in time sequence, and wherein said data conversion means monitors addresses in said second storage means into which said edge interval values are loaded and reads said edge interval values from said second storage means so that an address in said second storage means from which an interval value is being read will not exceed an address into which an interval value is being stored.

5. The demodulation device according to claim 1, wherein said edge detecting means comprises a plurality of edge detectors each of which corresponds to a respective one of multiple tracks on said optical recording medium that are read from simultaneously, said edge interval measuring means measures edge interval values on the basis of edges detected by said edge detectors, and said data conversion means sets thresholds for each track and compares said edge interval values with said thresholds representing upper and lower limits in said storage means for each track to thereby obtain demodulated bit strings for each track.

6. The demodulation device according to claim 2, wherein said edge detecting means comprises a plurality of edge detectors each of which corresponds to a respective one of multiple tracks on said optical recording medium that are read from simultaneously, said edge interval measuring means measures edge interval values on the basis of edges detected by said edge detectors, and said data conversion means sets thresholds for each track and compares said edge interval values with said thresholds representing upper and lower limits in said storage means for each track to thereby obtain demodulated bit strings for each track.

7. The demodulation device according to claim 1, further comprising interval value storage means for storing interval values measured by said edge interval measuring means, said interval value storage means storing an interval value measured by said edge interval measuring means when it reaches a predetermined value.

8. The demodulation device according to claim 2, further comprising interval value storage means for storing interval values measured by said edge interval measuring means, said interval value storage means storing an interval value measured by said edge interval measuring means when it reaches a predetermined value.

9. The demodulation device according to claim 7, further comprising means for making a decision that a gap is formed between two adjacent sectors on said optical recording medium when interval values equal to said predetermined value successively appear on addresses in said interval value storage means.

10. The demodulation device according to claim 8, further comprising means for making a decision that a gap is formed between two adjacent sectors on said optical recording medium when interval values equal to said predetermined value successively appear on addresses in said interval value storage means.

* * * * *